US012659641B2

(12) United States Patent
Ding et al.

(10) Patent No.: US 12,659,641 B2
(45) **Date of Patent: *Jun. 16, 2026**

(54) INTEGRATED MICROPHONE CONFIGURATION DIRECTED AT ELECTRONIC AND MECHANICAL NOISE REDUCTION

(71) Applicant: Google LLC, Mountain View, CA (US)

(72) Inventors: Shengyin Ding, Cupertino, CA (US); Chuan-Hsien Cheng, San Jose, CA (US); Wade Forrest Conklin, San Jose, CA (US); Gemin Li, Pleasanton, CA (US); Andrew James Orr, Evanston, IL (US)

(73) Assignee: Google LLC, Mountain View, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 18/647,615

(22) Filed: Apr. 26, 2024

(65) Prior Publication Data

US 2025/0338051 A1     Oct. 30, 2025

(51) Int. Cl.
*G06F 1/16* (2006.01)
*H04R 1/04* (2006.01)
(Continued)

(52) U.S. Cl.
CPC .............. *H04R 1/04* (2013.01); *G06F 1/1658* (2013.01); *G06F 1/1686* (2013.01); (Continued)

(58) Field of Classification Search
CPC .... G06F 1/1658; G06F 1/1686; G06F 1/1684; G06F 1/1656; H04R 1/04; H04R 1/02; H04M 1/035; H04M 1/03
See application file for complete search history.

(56) References Cited

U.S. PATENT DOCUMENTS 8,055,003 B2 * 11/2011 Mittleman ............. H04R 1/023
                                                                381/387
8,804,993 B2 * 8/2014 Shukla .................... H04R 1/34
                                                                381/189

(Continued)

FOREIGN PATENT DOCUMENTS

EP          4024833 A1     7/2022

OTHER PUBLICATIONS

Ding, et al., "Reducing Internal Electronic Noise in Electronic Devices", Technical Disclosure Commons, https://www.tdcommons. org/dpubs_series/7170, Jul. 14, 2024, 11 pages.

*Primary Examiner* — Anthony M Haughton
(74) *Attorney, Agent, or Firm* — Colby Nipper PLLC

(57) ABSTRACT

This document describes an integrated microphone configuration for reducing electronic and mechanical noise in electronic devices. In aspects, a microphone is integrated within a housing of an electronic device that includes a plurality of electronic components. The housing of the electronic device includes a microphone port that defines a cavity extending from an exterior surface to an interior surface of the housing. The microphone port enables acoustic waves to propagate through the cavity to be detected by the microphone. A waterproof mesh is positioned within the microphone port and defines an interstitial volume between the waterproof mesh and the microphone. A cosmetic mesh is also positioned within the microphone port, above the waterproof mesh. The waterproof mesh and the cosmetic mesh are positioned in such a manner to reduce an electronic and/or mechanical noise originating from electronic components within the electronic device.

20 Claims, 16 Drawing Sheets

(51) Int. Cl.
  *H05K 5/00*    (2025.01)
  *H05K 7/00*    (2006.01)
  *H04M 1/03*    (2006.01)

(52) U.S. Cl.
  CPC ......... *H04M 1/035* (2013.01); *H04R 2410/03*
      (2013.01); *H04R 2499/11* (2013.01)

(56)      References Cited

U.S. PATENT DOCUMENTS

| | | | |
|---|---|---|---|
| 9,804,003 B2 * | 10/2017 | Yang | G01D 11/245 |
| 10,148,800 B1 * | 12/2018 | Frederickson | H04M 1/035 |
| 10,466,047 B2 * | 11/2019 | Ehman | G01L 19/0038 |
| 10,837,772 B2 * | 11/2020 | MacNeil | G01L 19/0654 |
| 12,407,969 B2 * | 9/2025 | Lin | H04M 1/026 |
| 12,477,051 B2 * | 11/2025 | Kim | H01Q 1/38 |
| 2012/0177237 A1 | 7/2012 | Shukla et al. | |
| 2015/0219608 A1 * | 8/2015 | Choi | G01N 33/0009 |
| | | | 73/23.2 |
| 2017/0026742 A1 * | 1/2017 | Karube | A45C 11/22 |
| 2017/0070795 A1 * | 3/2017 | Meyer | H04R 1/023 |
| 2018/0279028 A1 | 9/2018 | Mittleman et al. | |
| 2019/0259363 A1 * | 8/2019 | Seo | H04R 1/44 |
| 2021/0352388 A1 * | 11/2021 | Chen | H04R 1/02 |
| 2022/0286540 A1 * | 9/2022 | Gillier | H04R 1/025 |
| 2023/0188879 A1 * | 6/2023 | Woo | H05K 1/141 |
| | | | 381/91 |

* cited by examiner

Section 3–3

Section 5–5

1100

1102                                                        1104

1106                                                        1108

1200

1202
1204
1206
1208
1210
1212

1220

1202
1210

1300

1302

1304

1306

1310

1302

1304

1320

1302

1304

1306

1400 —

Electronic Device
1402

Microphone 1404

Processor(s) 1406

Computer-Readable Media
1408

Application(s) 1410

Operating System 1412

Network Interface 1414

Speaker 1416

Display 1418

Enclosure 1420

1402-1

1402-2

1402-3

1402-4

1402-5

1402-6

1402-7

INTEGRATED MICROPHONE CONFIGURATION DIRECTED AT ELECTRONIC AND MECHANICAL NOISE REDUCTION

BACKGROUND

Microphones are a critical component within electronic devices, enabling services such as videotelephony, sound-level monitoring for noise pollution, and other audio inputs. Example microphones include microelectromechanical systems (MEMS) microphones and electret microphones, both of which are frequently used in electronic devices, including smartphones, tablets, hearing aids, and vehicles. Some microphones, and their associated hardware (together referred to as "microphone systems"), are mounted onto a printed circuit board (PCB) using screws to reduce vibrations and rattling.

Challenges arise, however, in designing and manufacturing electronic devices with microphone systems that include screws due to, space constraints within the electronic devices. Most electronic devices have limited space to house electronic components, so optimizing a size and a shape of internal electronic systems is increasingly important. For example, some solutions involve reducing a gap around a microphone by surrounding it with a rigid PCB. However, microphones surrounded by a rigid PCB tend to vibrate and create unwanted electronic and/or mechanical noise. To counteract these effects, a screw or a bracket can be used to secure the microphone but may result in a larger microphone system consuming excess space in already space-constrained electronic devices.

Further challenges arise with pressure differentials between an outside of an electronic device and internal cavities inside the electronic device (e.g., sealed microphone ports), which can cause air flow inside the electronic device. This air flow can cause electronic components within the device to vibrate and cause a microphone to detect undesired noises. Additionally, some microphones are positioned within electronic devices in proximity to one or more electronic modules. As a result, when a respective electronic module of the one or more electronic modules is activated, the microphone may detect noise (e.g., electronic humming, mechanical vibrations) stemming from the respective electronic module (e.g., capacitors, cameras). This noise, when recorded by a microphone is referred to as e-noise, which may cause an unwanted disturbance to be superimposed on a desired audio signal. This e-noise may be apparent to a user as an audible tonal noise when reproduced by a speaker in the electronic device and may be recognized by the user as crackling, humming, buzzing, and/or hissing sounds, which can degrade audio quality and diminish user experience.

SUMMARY

This document describes an integrated microphone configuration for reducing electronic and mechanical noise in electronic devices. In aspects, a microphone is integrated within a housing of an electronic device that includes a plurality of electronic components. The housing of the electronic device includes a microphone port that defines a cavity extending from an exterior surface to an interior surface of the housing. The microphone port enables acoustic waves to propagate through the cavity to be detected by the microphone. A waterproof mesh is positioned within the microphone port and defines an interstitial volume between the waterproof mesh and the microphone. A cosmetic mesh is also positioned within the microphone port, above the waterproof mesh. The waterproof mesh and the cosmetic mesh are positioned in such a manner to reduce an electronic and/or mechanical noise originating from electronic components within the electronic device.

In aspects, an electronic device is disclosed. The electronic device includes a housing that has an exterior surface and an opposing interior surface. The housing also includes a plurality of electronic components. The plurality of electronic components includes a microphone that has a top side and a bottom side. The electronic device also includes a microphone port that defines a cavity in the housing. The cavity extends from the exterior surface to the interior surface of the housing. The microphone port enables acoustic waves to propagate from an environment surrounding the housing through the cavity to the microphone for detection. The electronic device further includes a waterproof mesh positioned within the microphone port between the microphone and the exterior surface of the housing. The waterproof mesh stack includes a sealing layer positioned as a topmost layer and a waterproof mesh positioned under the sealing layer. The sealing layer is configured to absorb mechanical vibrations. The waterproof mesh is disposed within the microphone port sufficient to define a first region and a second region. The first region extends from a plane defined by the exterior surface to the waterproof mesh and the second region extends from the waterproof mesh to the microphone.

This Summary is provided to introduce simplified concepts for an integrated microphone configuration within an electronic device directed at electronic and mechanical noise reduction, which is further described below in the Detailed Description and is illustrated in the Drawings. This Summary is intended neither to identify essential features of the claimed subject matter nor for use in determining the scope of the claimed subject matter.

BRIEF DESCRIPTION OF THE DRAWINGS

The details of one or more aspects of an integrated microphone configuration directed at electronic and mechanical noise reduction are described in this document with reference to the following drawings. The use of the same numbers in different instances may indicate similar features or components.

DETAILED DESCRIPTION

Overview

This document describes an integrated microphone configuration directed at electronic noise ("e-noise") and mechanical noise reduction originating from electronic components integrated within an electronic device. In some instances, audible disturbances caused by internal electronic components may result in unwanted signals (e.g., noise) superimposed on desired audio signals, which can negatively impact audio capture quality and reliability.

To this end, this document describes an integrated microphone configuration for reducing electronic and mechanical noise in electronic devices. In aspects, a microphone is integrated within a housing of an electronic device that includes a plurality of electronic components. The housing of the electronic device includes a microphone port that defines a cavity extending from an exterior surface to an interior surface of the housing. The microphone port enables acoustic waves to propagate through the cavity to be detected by the microphone. A waterproof mesh is positioned within the microphone port and defines an interstitial volume between the waterproof mesh and the microphone. A cosmetic mesh is also positioned within the microphone port, above the waterproof mesh. The waterproof mesh and the cosmetic mesh are positioned in such a manner to reduce an electronic and/or mechanical noise originating from electronic components within the electronic device.

Features and concepts of the described techniques for an integrated microphone configuration directed at electronic and mechanical noise reduction can be implemented in any number of different electronic devices. Examples described herein include, but are not limited to, wireless earbuds, hearing aids, smartphones, tablets, laptops, two-way radios, and so forth.

Example Device

Figure 1:
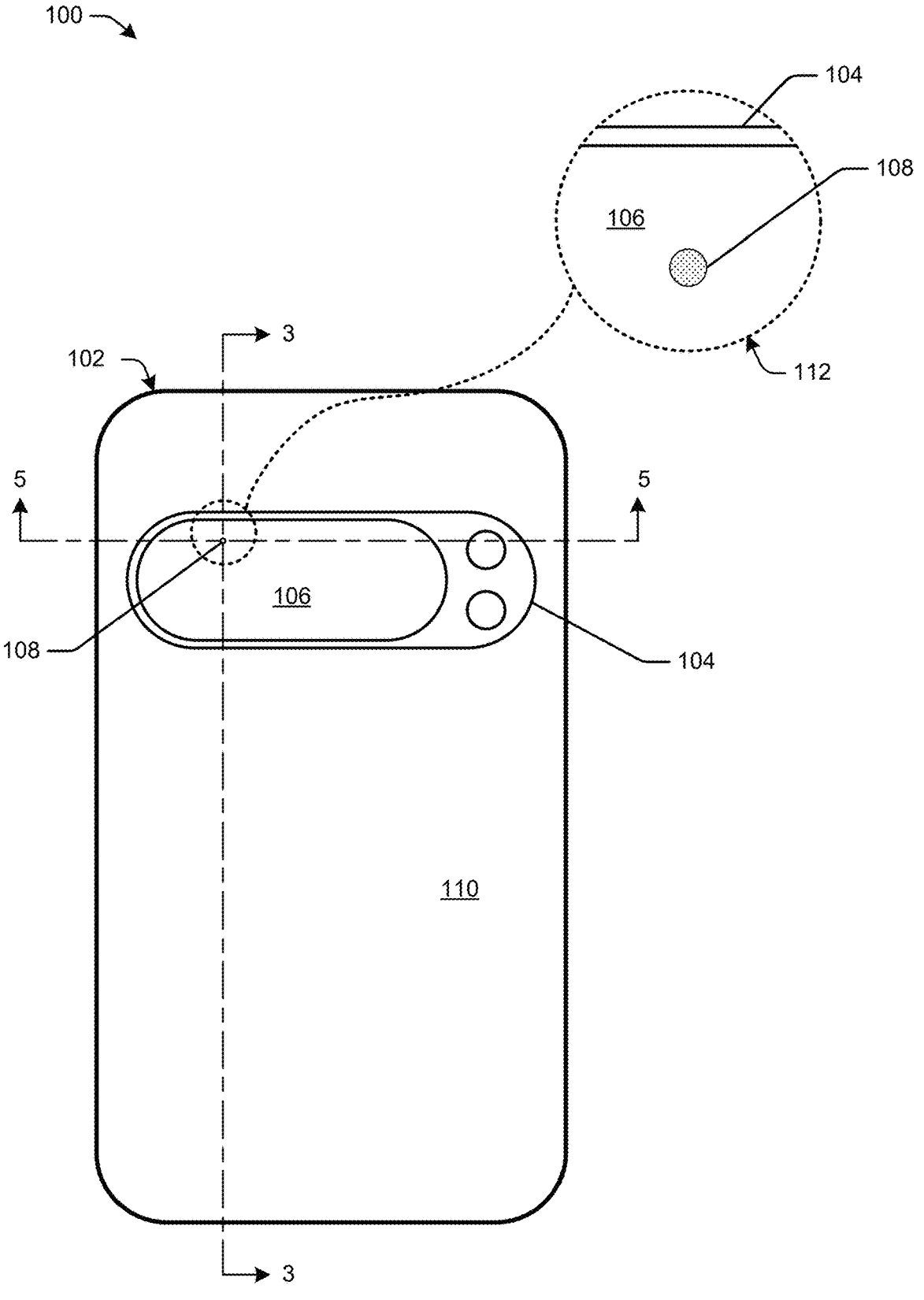
FIG. 1 illustrates a rear view of an example electronic device.

FIG. 1 illustrates a first example implementation 100 of an example electronic device 102. The electronic device 102 includes, for example only and not by way of limitation, a bezel 104, a camera lens glass 106, a microphone port 108, and a back cover glass 110. The first example implementation 100 includes a rear view of the example electronic device 102 and an enlarged view 112 of the microphone port 108. In implementations, the bezel 104 may be mounted on, or otherwise connected to, the back cover glass 110, using, for example, a first pressure-sensitive adhesive (PSA) and/or a locking mechanism. In further implementations, the camera lens glass 106 may be mounted on, or otherwise connected to, the bezel 104 using, for example, a second PSA and may be positioned within a cutout of the bezel 104 (see FIG. 2). As described herein, the second PSA disposed between the camera lens glass 106 and the bezel 104 may be referred to as a lens glass PSA. According to yet another implementation, the bezel 104 can be integral with the back cover glass 110, formed together in a molding or other formation process.

As an example, the first PSA is an acrylic-based PSA. Acrylic-based PSAs may have a high bonding capability with a variety of materials, such as metals and glass and may also have a high resistance to wear from environmental factors. In addition, because of their low densities, acrylic-based PSAs can reduce noises caused by vibrations from various electronic components by absorbing the noises. In another example, the second PSA may be an optically-clear PSA. An optically-clear PSA can be used in bonding applications with displays and screens (e.g., lens glass PSA) because of a low refractive index that does not distort the display. Optically clear PSAs can be silicone-based or acrylic-based and can have high shear resistance and high heat resistance.

The bezel 104, the camera lens glass 106, and the back cover glass 110 may define at least portions of a housing of the electronic device 102. The housing of the electronic device 102 may include an exterior surface (e.g., exposed to an environment surrounding the electronic device 102) and an interior surface (e.g., opposite the exterior surface). In aspects, the microphone port 108 may be an opening in the camera lens glass 106 and/or the bezel 104 that defines a cavity within the housing of the electronic device 102. The cavity may extend from the exterior surface of the housing to the interior surface. As an example, the cavity defined by the microphone port 108 may be a tubular cavity within the housing of the electronic device 102. The cavity defined by the microphone port 108 may enable acoustic waves to propagate from the environment surrounding the housing of the electronic device 102 to a microphone (not illustrated) for detection.

Although the microphone port 108 is illustrated as being on a backside of the electronic device 102, it will be understood by one skilled in the art that the microphone port 108 may be positioned on any side of the electronic device 102 (e.g., a frontside, a right side, a left side, a top side, or a bottom side). In additional implementations not illustrated, the electronic device 102 may include additional ports (e.g., a barometric port) and/or openings that may utilize one or more techniques or configurations described herein.

Figure 2:
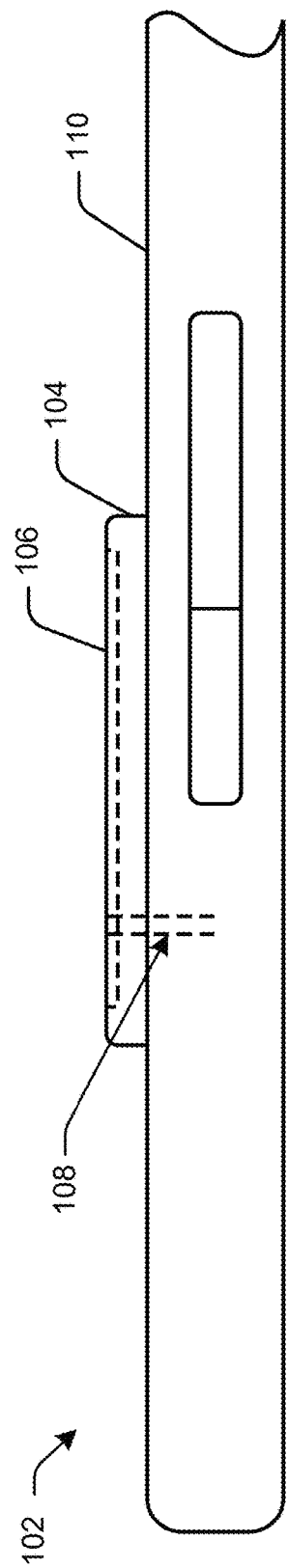
FIG. 2 illustrates a partial side view of the example electronic device of FIG. 1.

FIG. 2 illustrates an example implementation 200 of the electronic device 102 of FIG. 1. As illustrated, the example implementation 200 includes a partial side view of the electronic device 102. In implementations, the bezel 104 may be separate from and rise above the back cover glass 110. Additionally, the camera lens glass 106 may be positioned within a cutout of the bezel 104, and the camera lens glass 106 may adhere to the bezel 104 via the lens glass PSA. Further illustrated, the microphone port 108 extends from the exterior surface of the housing (e.g., defined by the camera lens glass 106) to an interior surface, surrounding an internal cavity housing a plurality of electronic components (not illustrated).

Although the electronic device 102 of FIG. 1 and FIG. 2 are illustrated as a smartphone, the electronic device 102 may also be implemented as any other electronic device including, but not limited to, a laptop, a tablet, a two-way radio, a hearing aid, an earbud, or a smartwatch. For example, a two-way radio may have a microphone port positioned on a frontside of the electronic device housing. The two-way radio may also include a cavity defined by the microphone port. A first user who wants to communicate with a second user through the two-way radio may speak towards the microphone port, and the cavity may enable the acoustic waves from the first user's voice to propagate to a microphone in the electronic device for detection.

Figure 3:
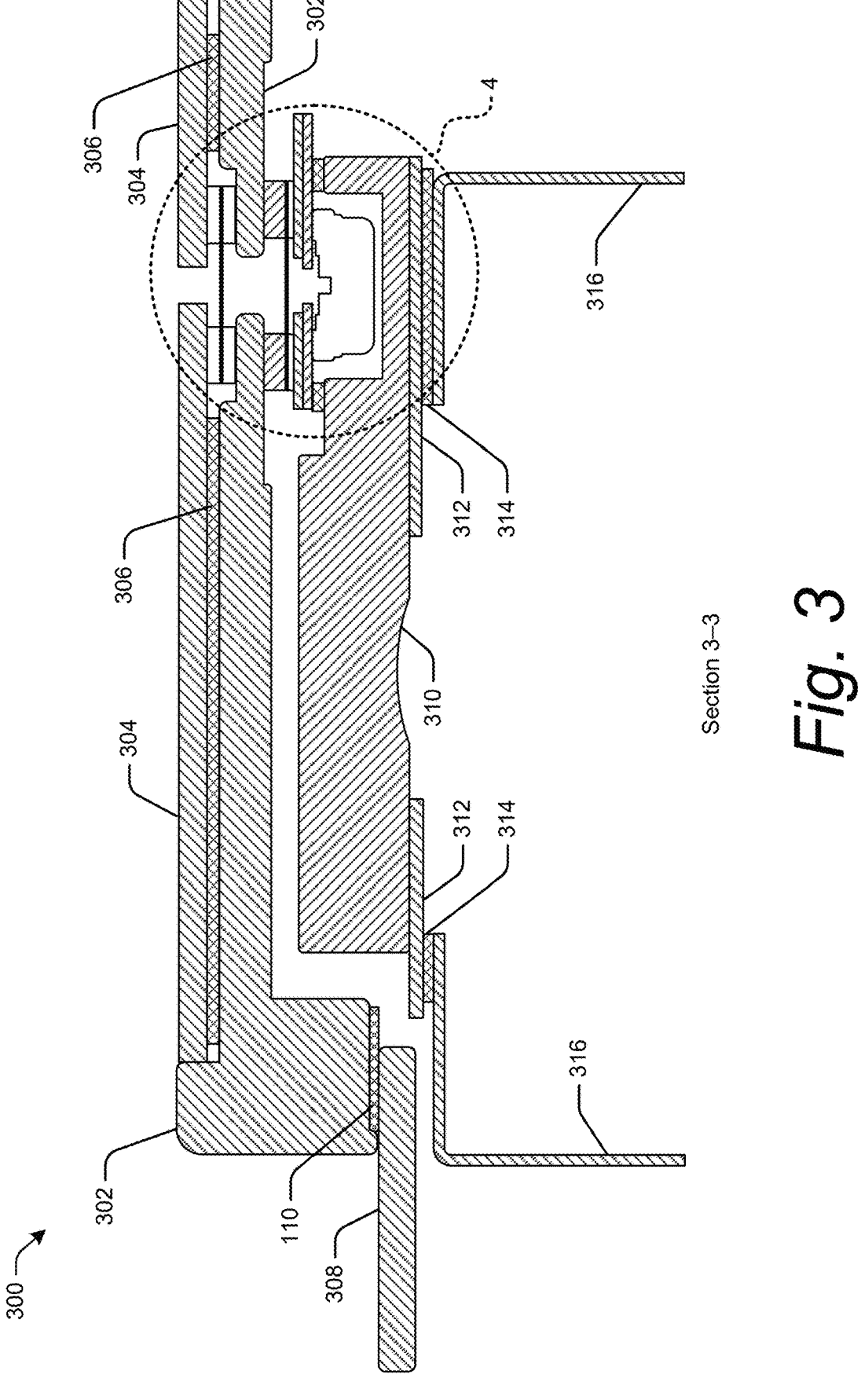
FIG. 3 illustrates a vertical cross-section of an electronic device, taken at line 3-3 in FIG. 1.

FIG. 3 further illustrates an example implementation 300 of the electronic device 102 of FIG. 1. As illustrated, the example implementation 300 includes a vertical cross-sectional view of the electronic device 102 taken at and in the direction indicated by section line 3-3 in FIG. 1. The electronic device 102 further includes a bezel 302 (e.g., bezel 104), a camera lens glass 304 (e.g., camera lens glass 106), lens glass PSA 306, a back cover glass 308 (e.g., back cover glass 110), a spacer bracket 310, a flexible circuit board 312, a third PSA 314, and a camera shield cover 316. Similar to the first example implementation 100 illustrated in FIG. 1, the bezel 302 may be mounted on, or otherwise connected to the back cover glass 308 with, for example, the third PSA 314, and the camera lens glass 304 may be disposed within a cutout of the bezel 302 using the lens glass PSA 306.

In implementations, the spacer bracket 310 is positioned under the bezel 302. The spacer bracket 310 may enclose a microphone (see FIG. 4) and may be supported by the flexible circuit board 312. In implementations, the flexible circuit board 312 may be a type of flexible PCB (e.g., a flex PCB, a flex circuit) including, but not limited to, a single-sided flexible PCB, a double-sided flexible PCB, a multi-layer flexible PCB, or a rigid-flex (e.g., hybrid) PCB. The flexible circuit board 312 may connect to the camera shield cover 316 via the third PSA 314. In implementations, the third PSA 314 may include electrical properties, including an electrical conductivity. In further implementations, the third PSA 314 is electrically conductive, providing a grounding path between the flexible circuit board 312 and the shield cover 316.

Figure 4:
FIG. 4 illustrates an enlarged view of a portion of the cross-section of FIG. 3.

FIG. 4 illustrates an example microphone system 400 of the example implementation 300 of the electronic device 102. As illustrated, the microphone system 400 includes a microphone port 402 (e.g., microphone port 108), a cosmetic mesh stack 404, a waterproof mesh stack 406, a main circuit board 408, PSA 410, a microphone 412, and a waterproof mesh 414. FIG. 4 also includes the bezel 302, the camera lens glass 304, the spacer bracket 310, the flexible circuit board 312, the third PSA 314, and the camera shield cover 316.

In aspects, the microphone port 402 may connect to a cavity in the housing of the electronic device 102 that extends from the outer surface of the camera lens glass 304 to an acoustic inlet of the microphone 412. The cavity may include an opening in the camera lens glass 304 and the bezel 302. The cavity may extend through the camera lens glass 304, the bezel 302, and/or other components of the microphone system 400. The cosmetic mesh stack 404 may be positioned above the waterproof mesh stack 406 and may adhere to the bezel 302 and/or the camera lens glass 304. In some implementations, the cosmetic mesh stack 404 may adhere to the bezel 302 and leave a gap between the cosmetic mesh stack 404 and the camera lens glass 304. The waterproof mesh stack 406 may be positioned above the microphone 412 and may adhere onto the main circuit board 408. In some implementations, the cosmetic mesh stack 404 and the waterproof mesh stack 406 may be substantially parallel to each other. See FIG. 6 for more detail on the cosmetic mesh stack 404 and the waterproof mesh stack 406.

The waterproof mesh 414 within the waterproof mesh stack 406 may define a first region and a second region within the cavity of the microphone port 402. The first region may extend from the exterior surface of the camera lens glass 304 to the waterproof mesh 414 of the waterproof mesh stack 406. The second region may extend from the waterproof mesh 414 to the microphone 412. In some implementations, the cosmetic mesh stack 404 may be positioned within the first region of the cavity.

In aspects, the waterproof mesh stack 406 may be positioned above the microphone 412 based on an acoustic transfer impedance (e.g., a measure of how easily sound energy can pass from one medium to another) of the waterproof mesh 414 and may define an interstitial volume of the second region within the cavity of the microphone port 402. The acoustic transfer impedance of the waterproof mesh 414 and the interstitial volume between the waterproof mesh 414 and the microphone 412 may reduce an electronic noise and/or a mechanical noise produced by at least one electronic component within the electronic device 102. For example, by reducing an interstitial volume between the waterproof mesh 414 and the microphone 412, less gasses may occupy that space. Due to the limited interstitial volume in the second region, there may be insufficient air displacement in the second region caused by sounds originating from, for example, internal electronic components (e.g., electronic humming, mechanical vibrations). Thus, sounds originating from internal electronic components may not be at a magnitude detectable by the microphone 412 due to the minimized air displacement. Still further, various acoustic transfer impedances of one or more waterproof meshes may be tested in combination with variable interstitial volumes to identify a location and an acoustic transfer impedance that minimizes and/or refrains from amplifying noises caused by internal electronic components.

In implementations, a width (or diameter) of the cavity within the second region of the microphone port 402 ranges from 0.5 millimeters (mm) to 1 mm. As an example, an average width (or diameter) of the cavity within the second region of the microphone port 402 is 0.85 mm. A distance between the waterproof mesh 414 and the microphone 412 (e.g., a length of the second region) may range from 0.01 mm to 0.2 mm. As an example, the interstitial volume of the second region is 0.23 cubic millimeters. In another example, the interstitial volume includes a volume between 0.15 cubic millimeters and 0.30 cubic millimeters. Such an interstitial volume of gas within the second region may minimize or altogether prevent noises caused by internal electronic components due to insufficient air displacement. In still further implementations, a width (or diameter) of the cavity within the first region of the microphone port 402 ranges from 0.5 mm to 1 mm. As an example, an average width (or diameter) of the cavity within the first region of the microphone port 402 is 0.85 mm. A distance between the waterproof mesh 414 and the exterior surface of the camera lens glass 304 (e.g., a length of the first region) may range from 0.5 mm to 2 mm. As an example, a length of the first region is 1.22 mm.

In further implementations, the waterproof mesh 414 includes a polytetrafluoroethylene (PTFE) or an expanded PTFE (ePTFE) material, which may have an airflow of 10,000 to 20,000 milliliters of flow per minute per square centimeter of area (ml/min/cm$^2$), an ingress protection (IP) rating of IP67 or IP68$^2$, and a thickness of 0.2 mm to 0.35 mm. In one example, an impedance of the waterproof mesh 414 at 200 Hertz (Hz) and 1 kHz is 4659 Rayls meter-kilogram-second (MKS) and 1853 Rayls MKS, respectively.

As a further example, an electronic device may experience an altitude or temperature change, which may cause a sound pressure differential to occur between the second region and the exterior of the electronic device. The sound pressure differential may cause air flow to occur due to air moving from high pressure environments to low pressure environments. The air flow within the cavity may cause electronic components to vibrate and make noise, which may be detectable by the microphone within the electronic device. To counteract this effect, a waterproof mesh having an optimized acoustic transfer impedance, air permeability, and/or location in relation to the microphone 412 may minimize pressure build up in the second region, reducing the volumetric air flow and/or volumetric air flow rate.

In implementations, the main circuit board 408 may be a rigid or non-flexible metal circuit board. In some implementations, the main circuit board 408 may be a type of rigid PCB, including, but not limited to, a single-sided rigid PCB, a double-sided rigid PCB, or a multi-layer rigid PCB. The main circuit board 408 may be electrically coupled to the flexible circuit board 312, and the microphone 412 may be operatively coupled to (e.g., soldered to) the flexible circuit board 312 such that the microphone 412 is electrically coupled to the main circuit board 408 via the flexible circuit board 312. Based on the mounting of the microphone 412 onto the flexible circuit board 312, the microphone 412 may have a "floating" configuration. For example, the floating configuration may produce a gap between the spacer bracket 310 and the microphone 412. The spacer bracket 310 may encompass the microphone 412 and may connect to the flexible circuit board 312 through the PSA 410. The flexible circuit board 312 may surround the spacer bracket 310 and may also connect to the camera shield cover 316 through the third PSA 314. In implementations, the flexible design of the microphone system 400 may allow for integration in multiple electronic devices because the microphone system 400 may fit in small spaces where other microphone systems may not.

Figure 5:
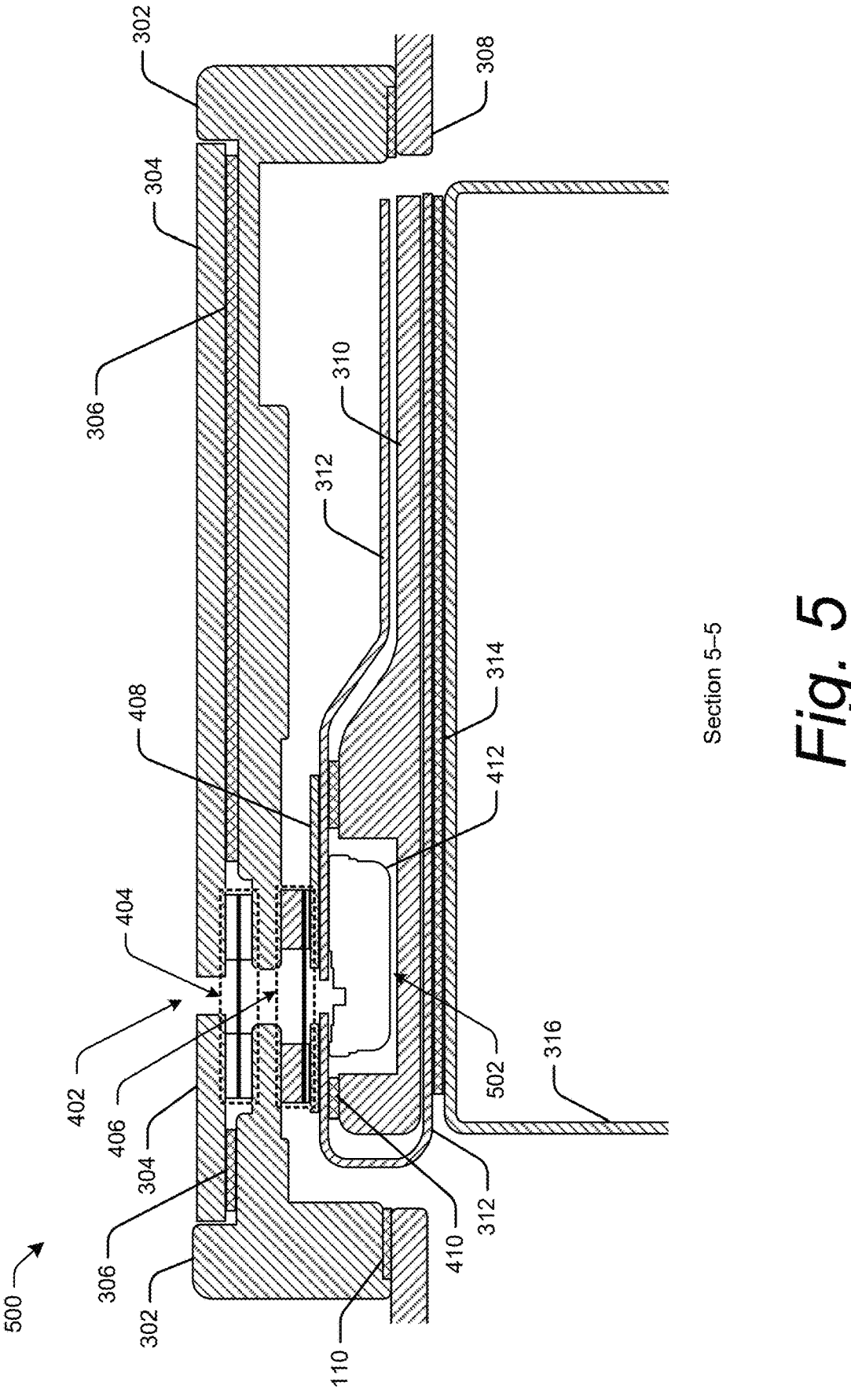
FIG. 5 illustrates a horizontal cross-section of an electronic device, taken at line 5-5 in FIG. 1.

FIG. 5 illustrates a fourth example implementation 500 of the electronic device 102 of FIG. 1. As illustrated, the fourth example implementation 500 includes a horizontal cross-sectional view of the electronic device 102 taken at and in the direction indicated by section line 5-5 in FIG. 1. The electronic device 102 includes the bezel 302, the camera lens glass 304, the lens glass PSA 306, the back cover glass 308, the spacer bracket 310, the flexible circuit board 312, the third PSA 314, and the camera shield cover 316 from the third example implementation 300 and also includes the components of the example microphone system 400 illustrated in FIG. 4.

In aspects, as illustrated in FIG. 5, the flexible circuit board 312 may surround the spacer bracket 310 in a "U" shape. The spacer bracket 310 may enclose but not touch the microphone 412, creating a gap 502. The gap 502 between the microphone 412 and the spacer bracket 310 may arrange the microphone system 400 in a floating configuration. In implementations, the floating configuration may allow the cosmetic mesh stack 404 and the waterproof mesh stack 406 to absorb vibrations throughout the electronic device 102. In further implementations, the floating configuration may promote coupling between the flexible circuit board 312 and the main circuit board 408 and may promote electrical coupling between the microphone 412 and the main circuit board 408.

Figure 6:
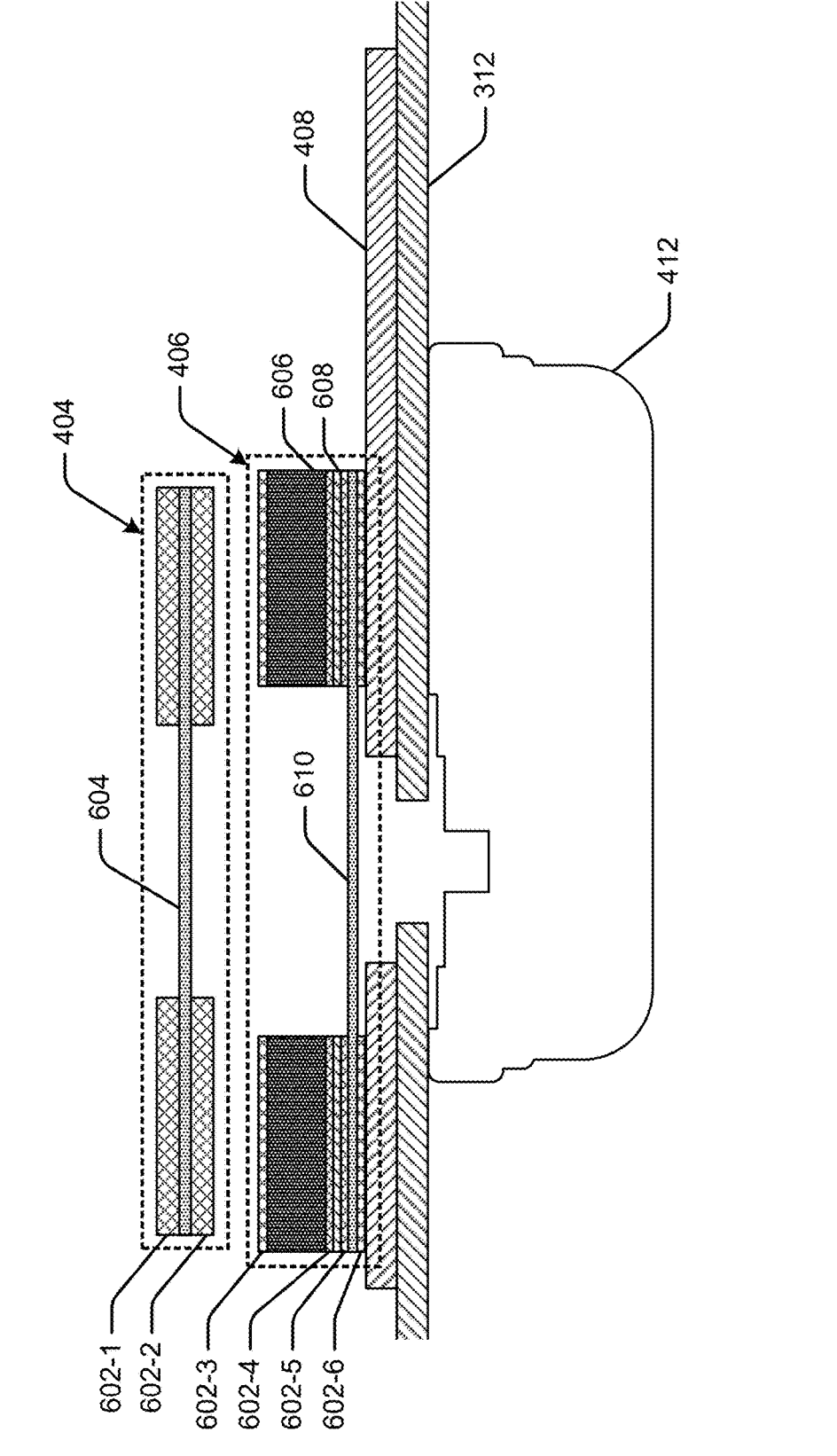
FIG. 6 illustrates a first example mesh stack configuration implemented within an electronic device.

FIG. 6 illustrates a first example mesh stack configuration 600 within the electronic device 102. As illustrated, the first example mesh stack configuration 600 includes a detailed cross-sectional view of the cosmetic mesh stack 404 and the waterproof mesh stack 406 from FIG. 4. The first example mesh stack configuration 600 includes adhesives 602, a cosmetic mesh 604, a sealing foam 606, a stiffener 608, and a waterproof mesh 610, as well as the flexible circuit board 312, the main circuit board 408, and the microphone 412 from FIG. 4.

In implementations, the cosmetic mesh stack 404 may include a first adhesive 602-1, the cosmetic mesh 604, and a second adhesive 602-2. In further implementations, the adhesives 602 may be acrylic adhesive tape. The cosmetic mesh 604 may be configured to have (or selected based on its) oleophobic properties, which may prevent oil and dust particles from passing into or through the cavity (e.g., microphone port 402). The waterproof mesh stack 406 may include a first adhesive 602-3, the sealing foam 606, a second adhesive 602-4, the stiffener 608, a third adhesive 602-5, the waterproof mesh 610, and a fourth adhesive 602-6. In some implementations, the sealing foam 606 can be an acrylic foam tape and may be used to fill tolerance gaps stemming from manufacturing or assembly of the electronic device 102. In implementations, the sealing foam 606 is configured to have impact resistance properties (e.g., can absorb energy from surrounding materials), which may minimize vibrations of components in or surrounding the cavity. For example, the sealing foam 606 may have an impact resistance greater than 1 kilojoule per square meter $(kJ/m^2)$ or 10 Newtons per centimeter (N/cm). In further implementations, the stiffener 608 can be a support material for the waterproof mesh 610, such as a thermoplastic polymer like polyethylene terephthalate (PET), for example. The waterproof mesh 610 may have hydrophobic and oleophobic properties to keep water, oils, and other particles (e.g., dust, hair, pollen, etc.) from getting to the microphone 412.

Figure 7:
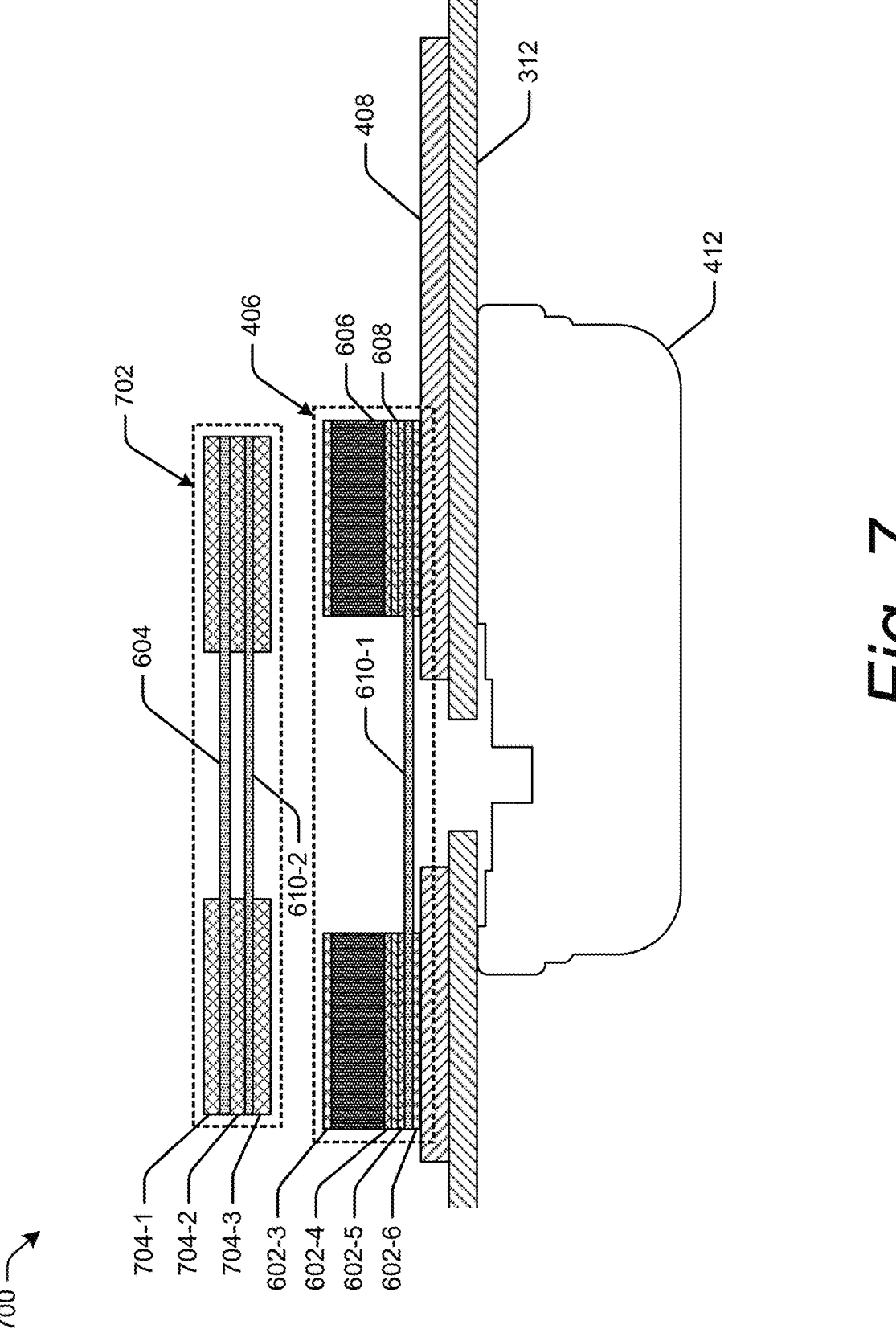
FIG. 7 illustrates a second example mesh stack configuration implemented within an electronic device.

FIG. 7 illustrates a second example mesh stack configuration 700 within the electronic device 102. In some implementations, the electronic device 102 may utilize a second waterproof mesh inside a microphone port (e.g., microphone port 402). For example, an electronic device with a longer or larger cavity may need a second waterproof mesh to prevent water from getting to a microphone. In addition, some electronic devices may have higher waterproof requirements and may, therefore, utilize a dual waterproof mesh design within the cavity to lower the water leakage risk to the microphone 412. A second waterproof mesh 610-2 may have a smaller acoustic transfer impedance than a first waterproof mesh 610-1 so that the addition of the second waterproof mesh 610-2 does not negatively impact acoustic wave propagation through the microphone port.

As illustrated, the second example mesh stack configuration 700 includes a cosmetic-and-waterproof mesh stack 702 and the waterproof mesh stack 406. The waterproof mesh stack 406 may include a first waterproof mesh 610-1. Instead of the cosmetic mesh stack 404 from FIG. 6, the second example mesh stack configuration 700 includes the cosmetic-and-waterproof mesh stack 702 which includes a first adhesive 704-1, the cosmetic mesh 604, a second adhesive 704-2, a second waterproof mesh 610-2, and a third adhesive 704-3.

In implementations, the first waterproof mesh 610-1 and the second waterproof mesh 610-2 may be the same material. For example, the waterproof meshes 610 may be composed of ePTFE. In additional implementations, the first waterproof mesh 610-1 and the second waterproof mesh 610-2 may be composed of different materials. For example, the first waterproof mesh 610-1 may be made of ePTFE, and the second waterproof mesh 610-2 may be made of woven PET. In some implementations, the two waterproof meshes 610 may be composed of identical materials with different thicknesses and characteristics. In further implementations, the first waterproof mesh 610-1 may have a larger acoustic transfer impedance than the second waterproof mesh 610-2.

In implementations, for the second example mesh stack configuration 700, a width (or diameter) of the cavity within the second region of the microphone port (e.g., from the first waterproof mesh 610-1 to the microphone 412) ranges from 0.5 millimeters (mm) to 1 mm. As an example, an average width (or diameter) of the cavity within the second region of the microphone port is 0.85 mm. A distance between the waterproof mesh 414 and the microphone 412 (e.g., a length of the second region) may range from 0.01 mm to 0.2 mm. As an example, the interstitial volume of the second region is 0.23 cubic millimeters. In another example, the interstitial volume includes a volume between 0.15 cubic millimeters and 0.30 cubic millimeters. In still further implementations, a width (or diameter) of the cavity within the first region of the microphone port 402 (e.g., from the first waterproof mesh 610-1 to the exterior surface of the camera lens glass 304) ranges from 0.5 mm to 1 mm. As an example, an average width (or diameter) of the cavity within the first region of the microphone port is 0.85 mm. A distance between the waterproof mesh 414 and the exterior surface of the camera lens glass (e.g., a length of the first region) may range from 0.5 mm to 2 mm. As an example, a length of the first region is 1.22 mm. A distance between the first waterproof mesh 610-1 and the second waterproof mesh 610-2 ranges from 1 mm to 1.3 mm. A distance between the second waterproof mesh 610-2 and the cosmetic mesh 604 ranges from 0.05 mm to 0.2 mm.

In further implementations, the first waterproof mesh 610-1 includes a PTFE or an ePTFE material, which may have an airflow of 10,000 to 20,000 milliliters of flow per minute per square centimeter of area (ml/min/cm$^2$), an ingress protection (IP) rating of IP67 or IP68$^2$, and a thickness of 0.2 mm to 0.35 mm. The second waterproof mesh 610-2 includes a PTFE or an ePTFE material, which may have an IP rating of IP68 and a thickness of 0.1 to 0.3 mm. In one example, an impedance of the first waterproof mesh 610-1 at 200 Hertz (Hz) and 1 kHz is 4659 Rayls meter-kilogram-second (MKS) and 1853 Rayls MKS, respectively, and an impedance of the second waterproof mesh 610-2 610-2 at 200 Hz and 1 kHz is 3302 Rayls MKS and 3297 Rayls MKS, respectively.

Figure 8:
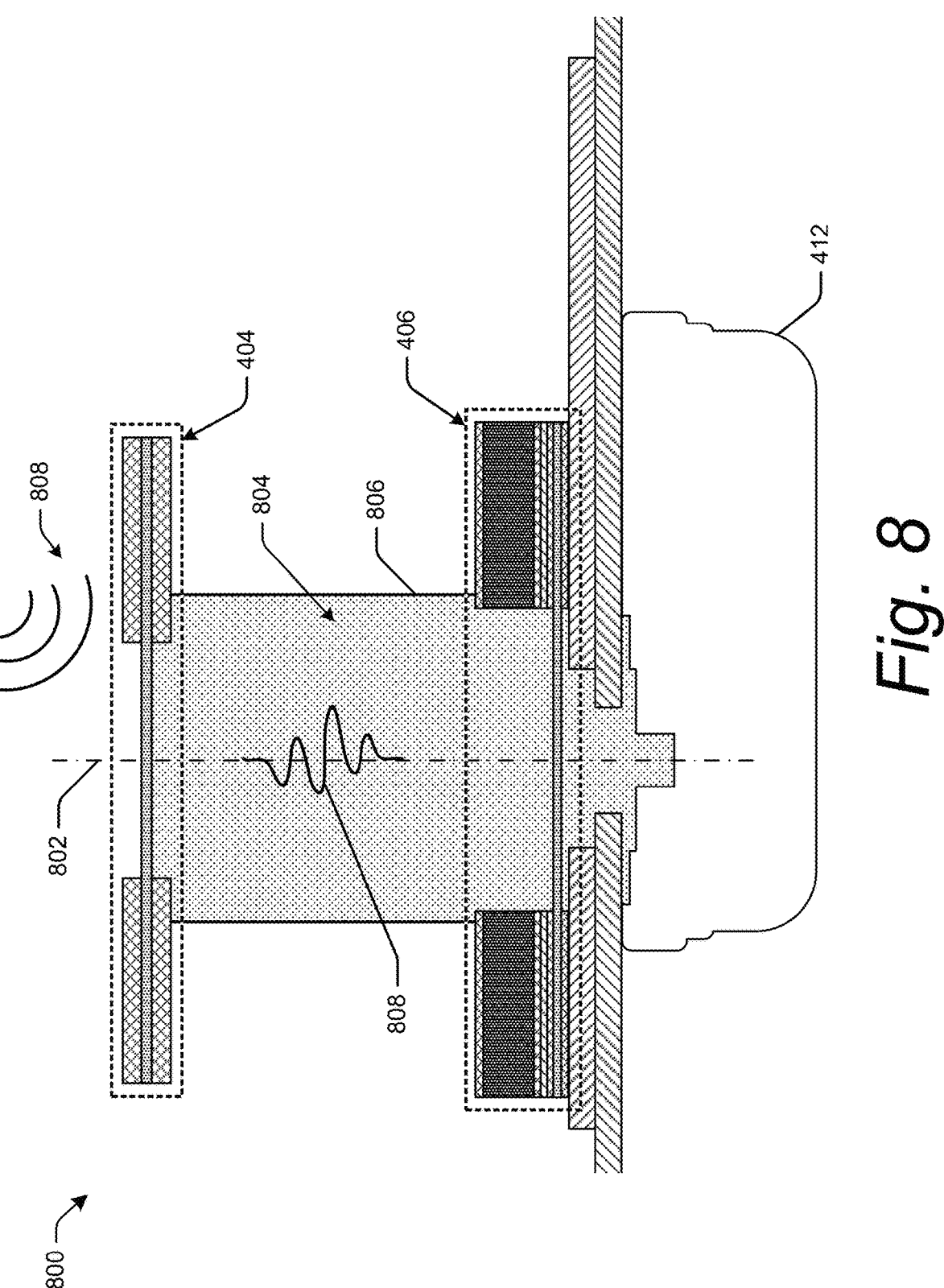
FIG. 8 illustrates an example implementation of a straight cavity within an electronic device.

FIG. 8 illustrates an example implementation 800 of a microphone port defining a straight cavity within an electronic device. As illustrated, the example implementation 800 includes a central axis 802 that may define a center line through a straight cavity 804. The straight cavity 804 may have cavity walls 806 that may enclose air and may allow acoustic waves 808 to propagate through from the environment surrounding the electronic device. The acoustic waves 808 may be detected by the microphone 412. The position of the cosmetic mesh stack 404 relative to the waterproof mesh stack 406 may determine the length and shape of the straight cavity 804 and the central axis 802. A diameter of the of the straight cavity 804 may not be uniform and may change depending on the cavity walls 806.

Figure 9:
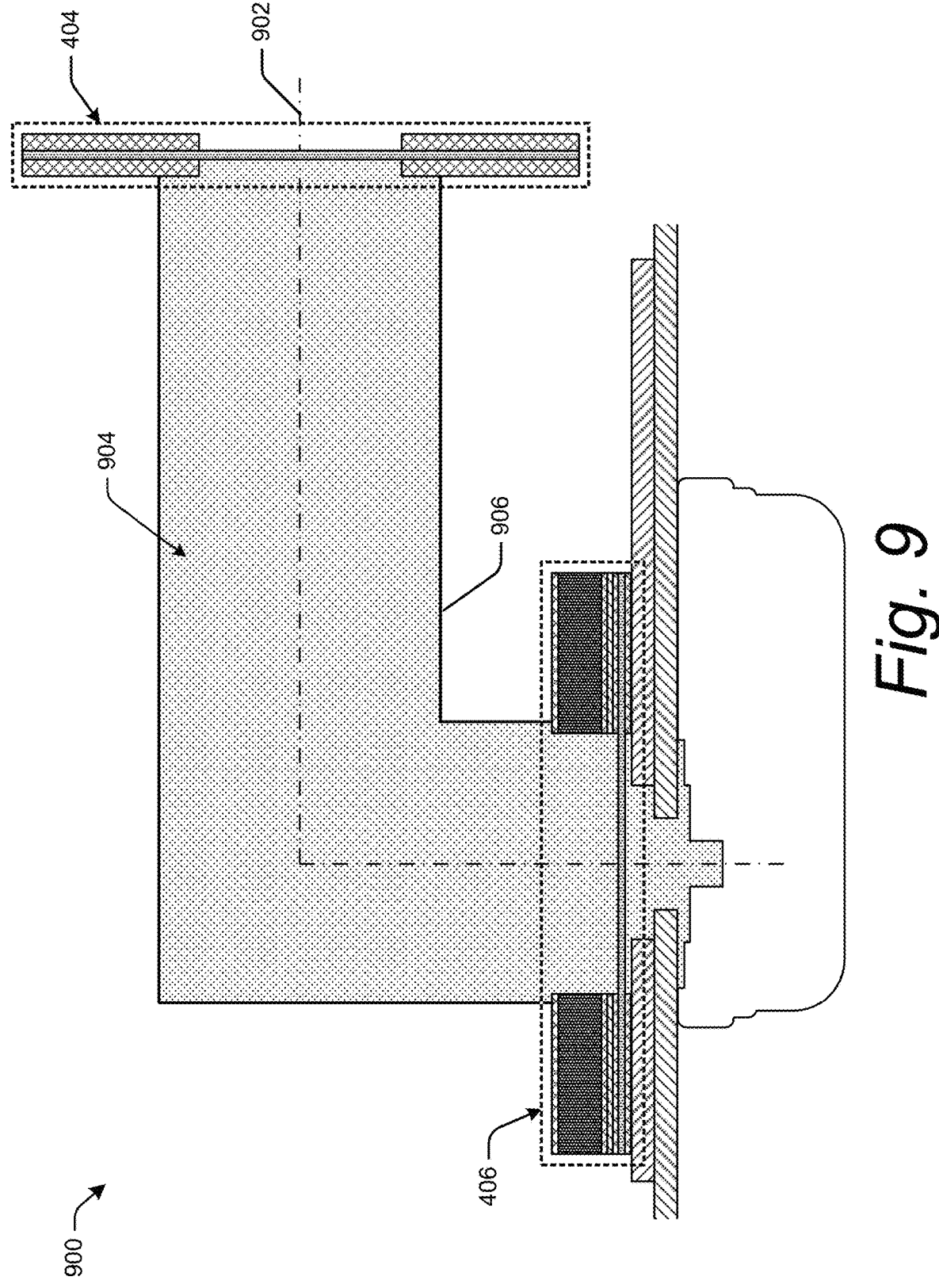
FIG. 9 illustrates an example implementation of a right-angle cavity within an electronic device.

FIG. 9 illustrates an example implementation 900 of a microphone port defining a right-angle cavity within an electronic device. As illustrated, the example implementation 900 includes a central axis 902 that may define a center line through a right-angle cavity 904. The right-angle cavity 904 may have cavity walls 906 that may enclose air and may allow acoustic waves (e.g., acoustic waves 808) to propagate through from the environment surrounding the electronic device.

In implementations, the right-angle cavity 904 may be used in electronic devices that have an exterior surface of the housing perpendicular to the interior surface of the housing. For example, a hearing aid may have a microphone port that opens into a cavity, which may have a right-angled shape to accommodate for the narrow and small size of the hearing aid.

Figure 10:
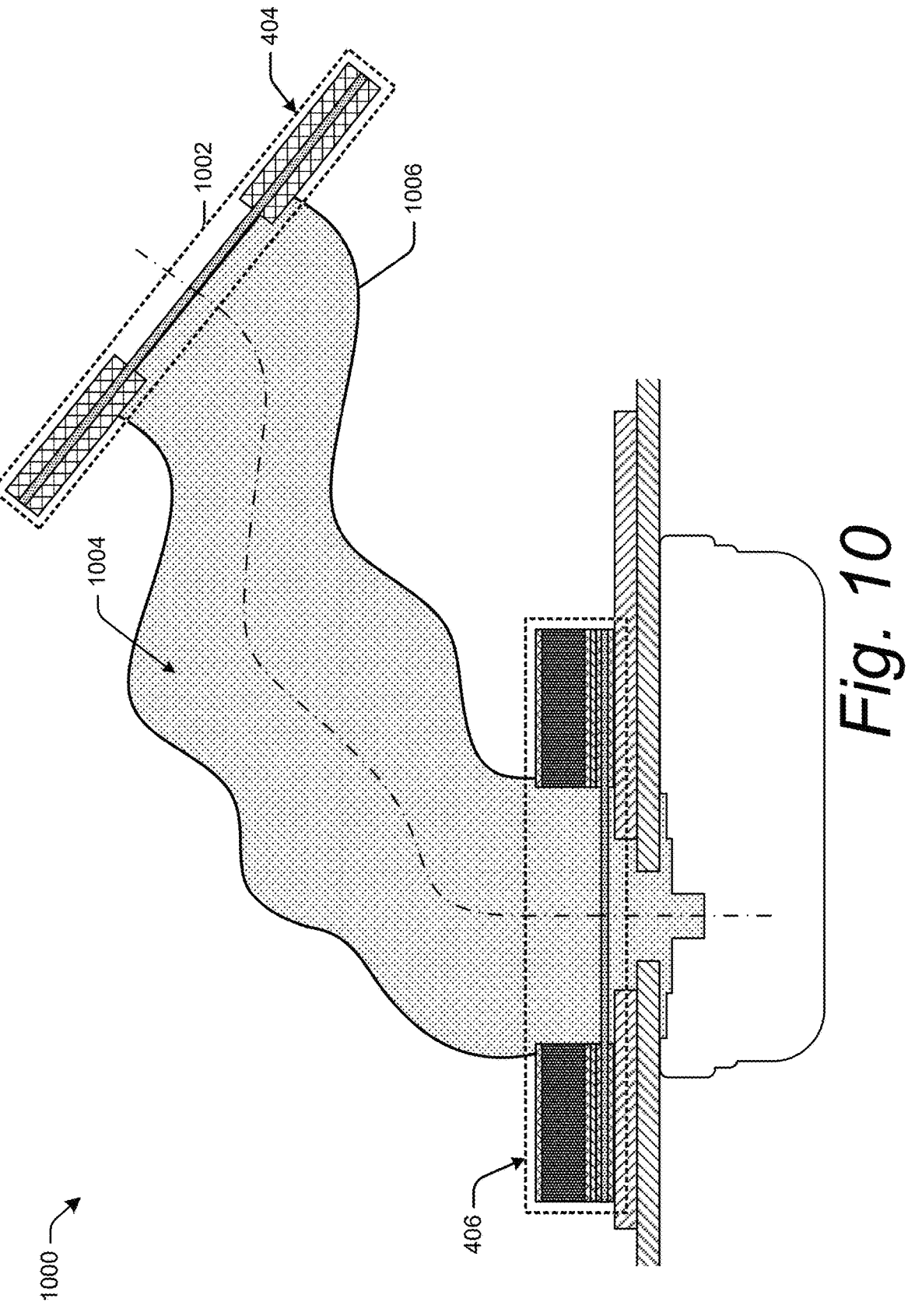
FIG. 10 illustrates an example implementation of a curved cavity within an electronic device.

FIG. 10 illustrates an example implementation 1000 of a microphone port defining a curved cavity within an electronic device. As illustrated, the example implementation 1000 includes a central axis 1002 that may define a center line through a curved cavity 1004. The curved cavity 1004 may have cavity walls 1006 that may enclose air and may allow acoustic waves (e.g., acoustic waves 808) to propagate through from the environment surrounding the electronic device.

In implementations, the curved cavity 1004 may be used in electronic devices that have obstacles between the two mesh stacks, and the cavity may be in a curved shape. For example, a small electronic device may have two electronic modules near a microphone port. The electronic modules may be between a waterproof mesh stack and a cosmetic mesh stack. As a result, a cavity between the two mesh stacks may curve around the two electronic modules to allow acoustic waves to pass through and be detected by the microphone.

Figure 11:
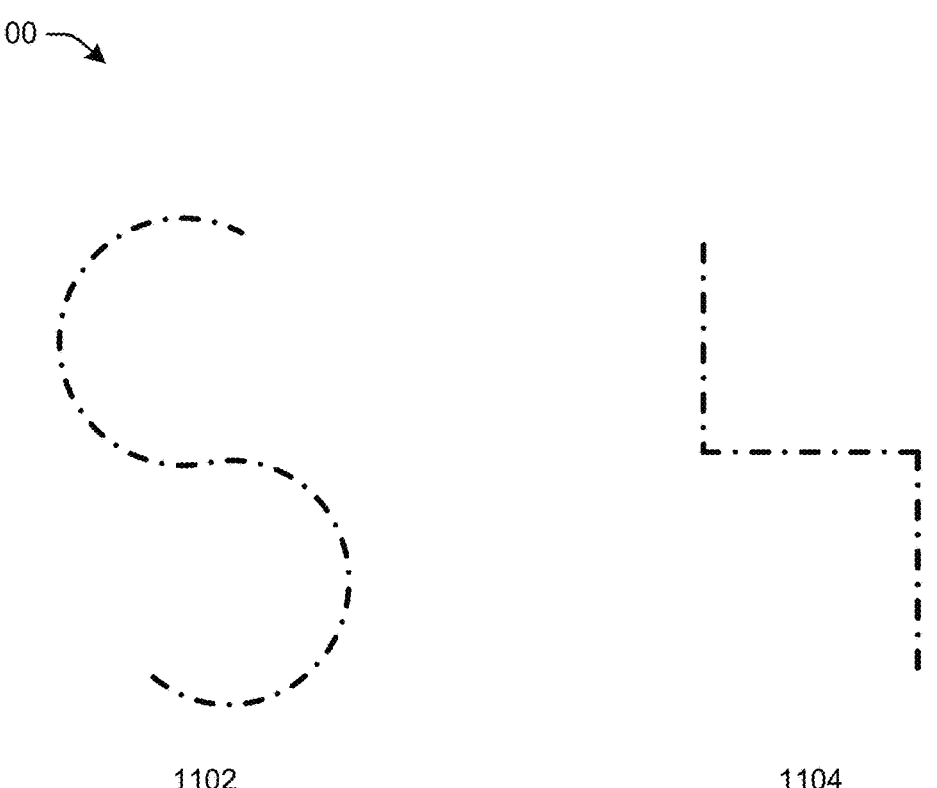
FIG. 11 illustrates four shapes of a cavity central axis that may be implemented within an electronic device.
Figure 11:
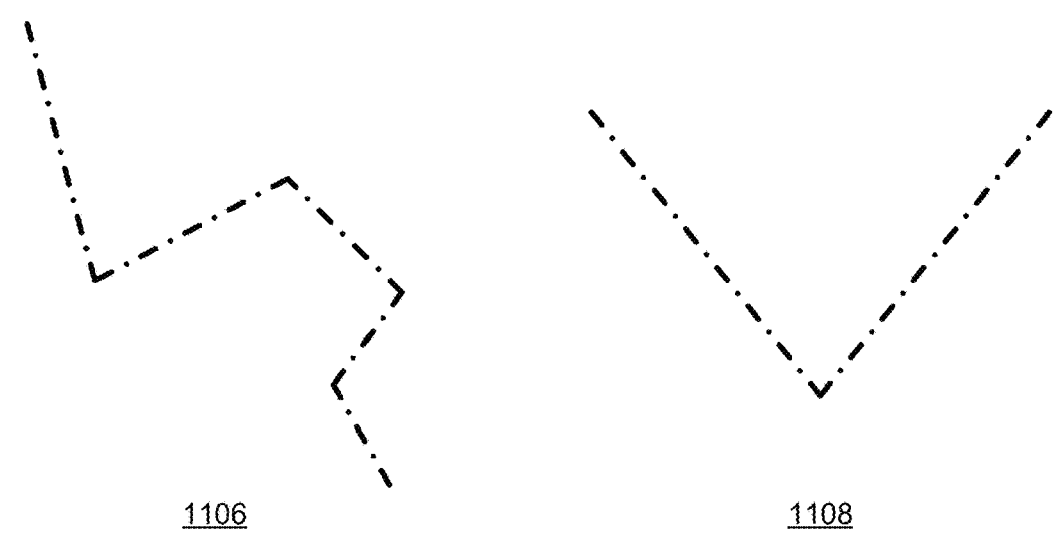

FIG. 11 illustrates an example implementation 1100 of four cavity central axis shapes that may be implemented within an electronic device. At 1102, the central axis is in an "S" shape. At 1104, the central axis includes two right angles from three lines. At 1106, the central axis includes one acute angle and three obtuse angles from five lines. Finally, at 1108, the central axis includes a "V" shape. All four central axis shapes are non-limiting examples of possible central axis shapes that a cavity may define. In implementations, the central axis, and by extension the cavity, within an electronic device may form any two-dimensional or three-dimensional shape. A cavity central axis may have a shape where the ends do not meet and fit within a package space provided for a microphone configuration.

Figure 12A:
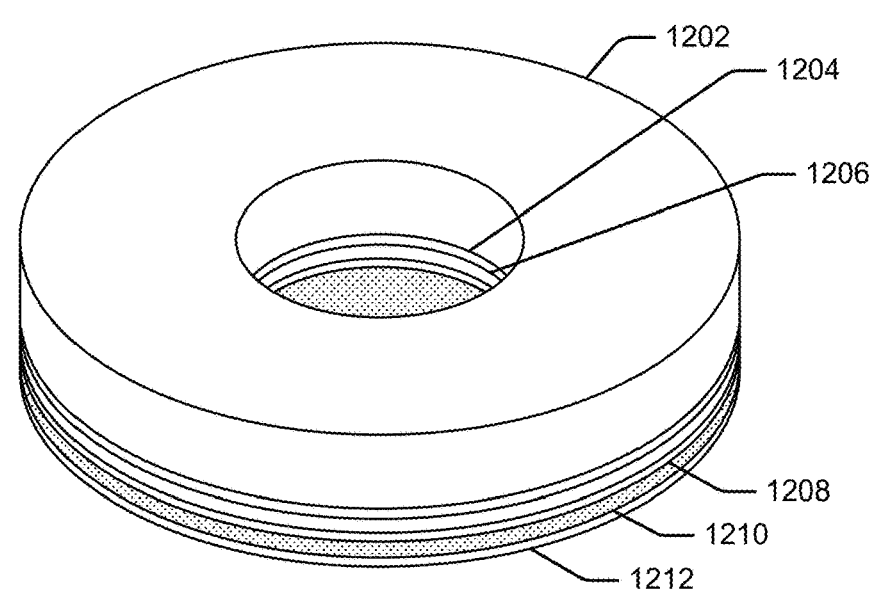
FIG. 12A illustrates an environmental view of a waterproof mesh stack.
Figure 12B:
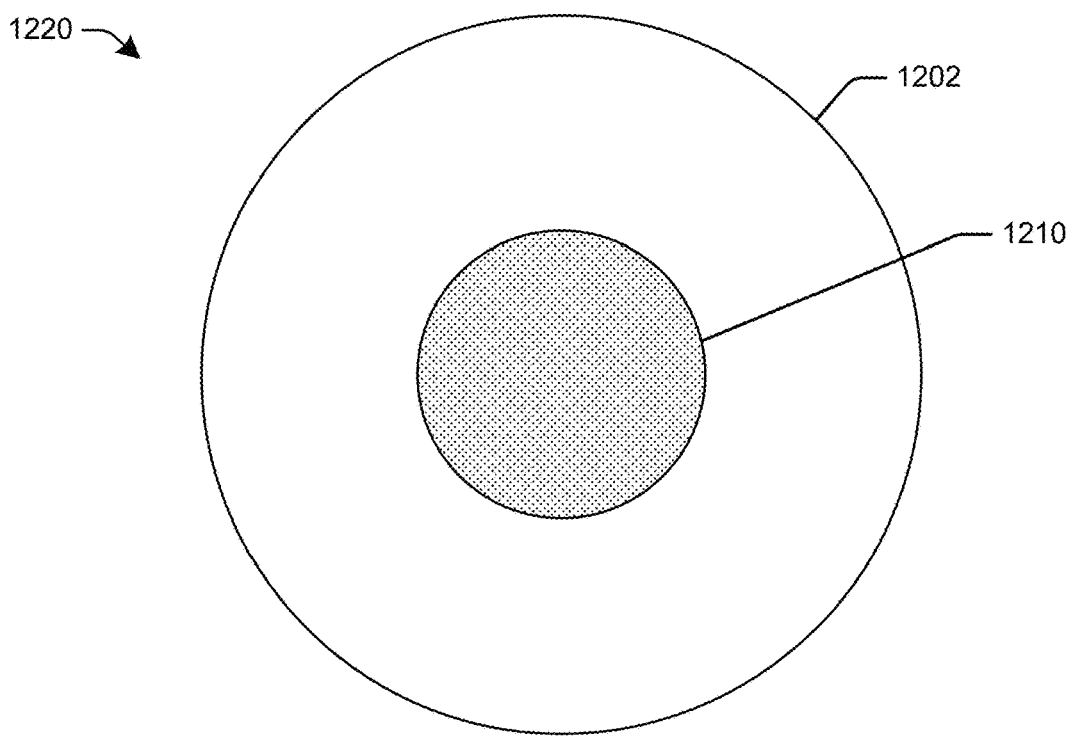
FIG. 12B illustrates a top view of a waterproof mesh stack.
Figure 12C:
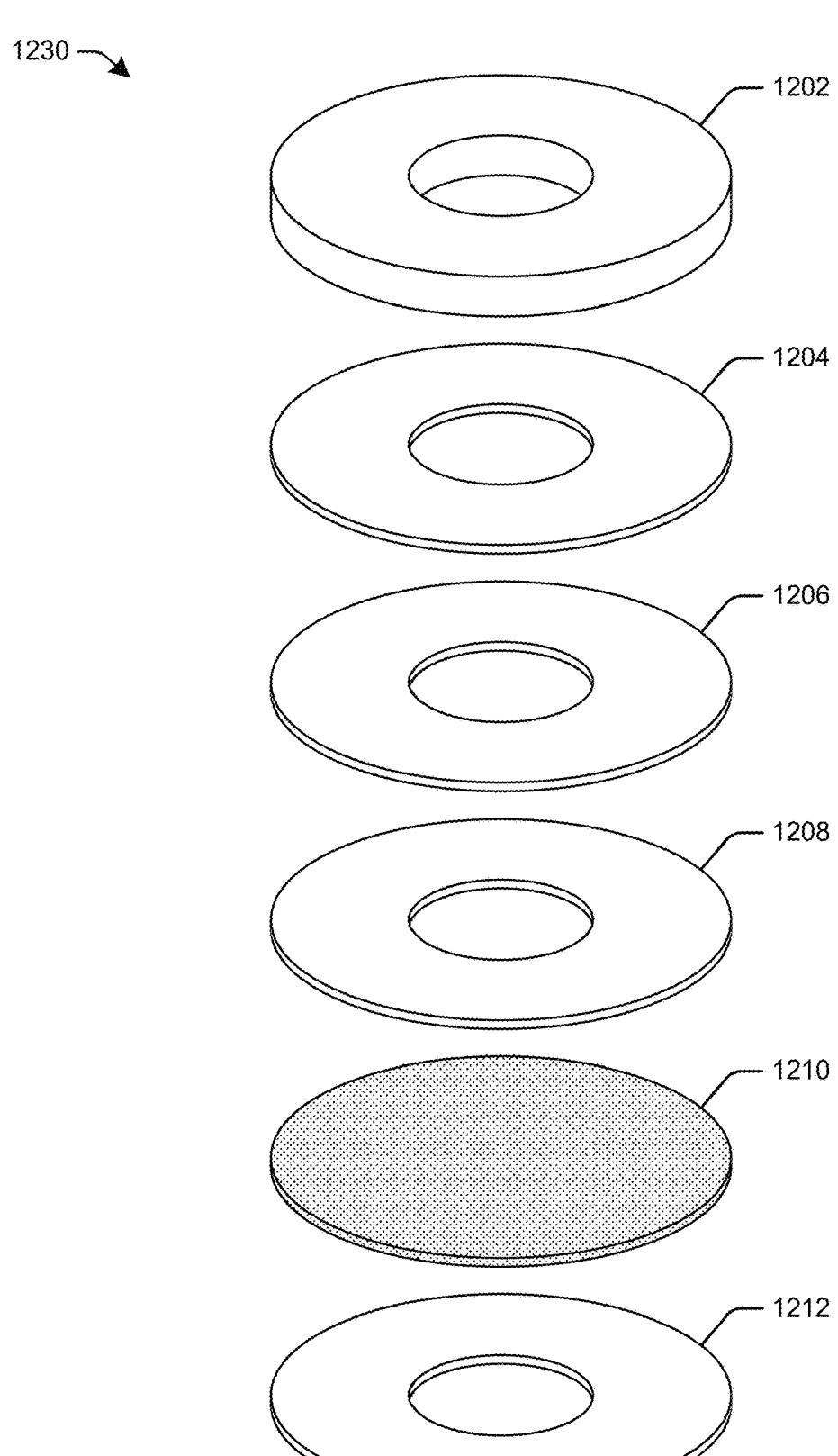
FIG. 12C illustrates an exploded view of a waterproof mesh stack.

FIGS. 12A-C illustrate example views of the waterproof mesh stack 406 from FIG. 4. FIG. 12A depicts an environmental view 1200 of the waterproof mesh stack 406. As illustrated, the waterproof mesh stack 406 includes a sealing layer 1202, a first adhesive layer 1204, a stiffening layer 1206, a second adhesive layer 1208, a waterproof mesh 1210, and a third adhesive layer 1212. FIG. 12B illustrates a top view 1220 of the waterproof mesh stack 406. As illustrated, the top view 1220 includes the sealing layer 1202 (e.g., the top layer) and the waterproof mesh 1210. The sealing layer 1202, the stiffening layer 1206, and the adhesive layers 1204, 1208, and 1212 are illustrated in a donut shape but may be a square or any other shape with a hole (e.g., a concentric hole, a non-concentric hole). The waterproof mesh 1210 is illustrated as a disk but may be in the shape of a square or any other shape that aligns with the other components of the waterproof mesh stack 406. FIG. 12C illustrates an exploded view 1230 of the waterproof mesh stack 406. In some implementations, the sealing layer 1202 may be thicker than other components in the waterproof mesh stack 406. For example, the sealing layer 1202 ranges in thickness from 0.05 mm to 0.15 mm. The impact resistance and the thickness of the sealing layer 1202 absorb additional vibrations that may otherwise cause noise in a desired audio signal output by the microphone.

Figure 13A:
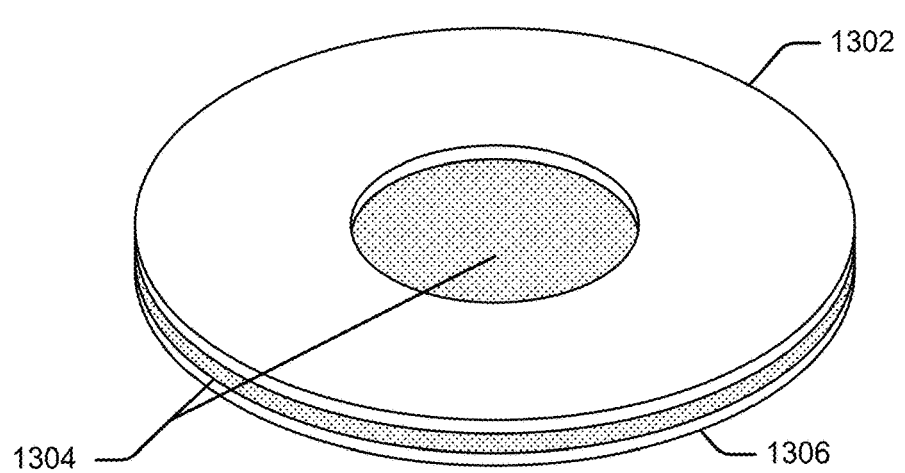
FIG. 13A illustrates an environmental view of a cosmetic mesh stack.
Figure 13B:
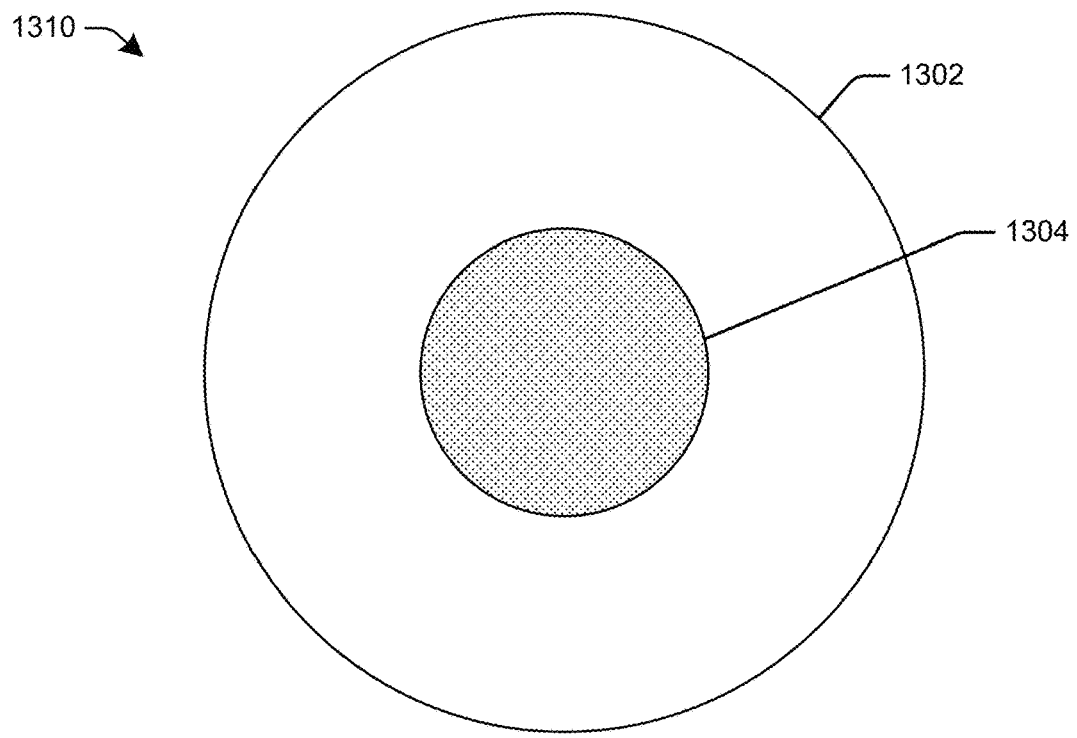
FIG. 13B illustrates a top view of a cosmetic mesh stack.
Figure 13C:
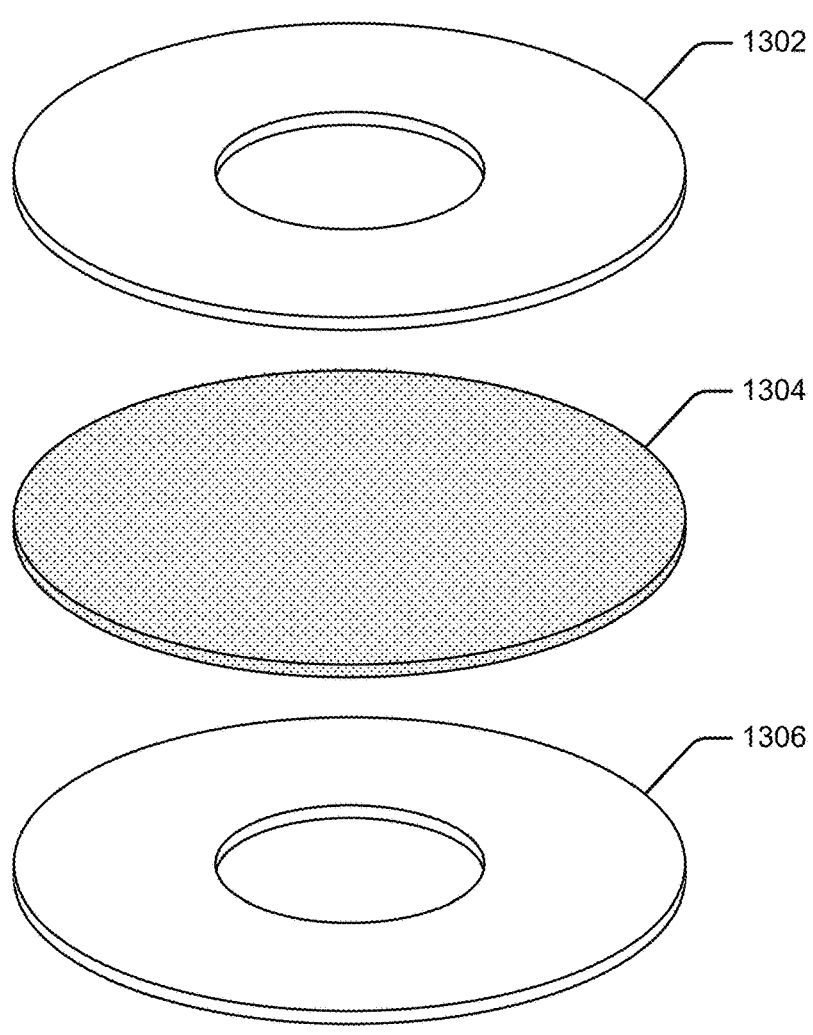
FIG. 13C illustrates an exploded view of a cosmetic mesh stack.

FIGS. 13A-C illustrate example views of the cosmetic mesh stack 404 from FIG. 4. FIG. 13A depicts an environmental view 1300 of the cosmetic mesh stack 404. As illustrated, the cosmetic mesh stack 404 includes a first adhesive layer 1302, a cosmetic mesh 1304, and a second adhesive layer 1306. FIG. 13B illustrates a top view 1310 of the cosmetic mesh stack 404. As illustrated, the top view 1310 of the cosmetic mesh stack 404 includes the first adhesive layer 1302 (e.g., the top layer) and the cosmetic mesh 1304. The first adhesive layer 1302 and the second adhesive layer 1306 are illustrated in a donut shape but may be a square or any other shape with a hole (e.g., a concentric hole, a non-concentric hole). The cosmetic mesh 1304 is illustrated as a disk but may be in the shape of a square or any other shape that aligns with the other components of the cosmetic mesh stack 404. FIG. 13C illustrates an exploded view 1320 of the cosmetic mesh stack 404. In some implementations, the cosmetic mesh stack 404 may not include the first adhesive layer 1302 if the top of the cosmetic mesh stack 404 does not adhere to a separate component.

Figure 14:
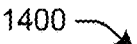
FIG. 14 illustrates an example implementation of an electronic device that can utilize a mesh stack configuration.

FIG. 14 illustrates an example implementation 1400 of an electronic device 1402 that can utilize the first example mesh stack configuration 600 from FIG. 6 and/or the second example mesh stack configuration from FIG. 7. The electronic device 1402 is illustrated with a variety of example devices, including wireless earbuds 1402-1, a smartphone 1402-2, a tablet 1402-3, a smartwatch 1402-4, a laptop 1402-5, a smarthome device 1402-6, and a video-camera 1402-7. Examples not shown include hearing aids, two-way radios, headsets, and video game controllers with built-in microphones. Note that the electronic device 1402 can be mobile, wearable, non-wearable but mobile, or relatively immobile. The electronic device 1402 can be any electronic device that includes a microphone and/or port (e.g., cavity).

The electronic device 1402 includes a microphone package 1404 (e.g., microphone system 400). As described herein, the microphone package 1404 may be implemented as a MEMS microphone or an electret microphone (e.g., microphone 412). The microphone package 1404 may include an application-specific integrated circuit (ASIC) for surface mounting or attaching to another PCB (e.g., flexible circuit board 312). The microphone package 1404 may be integrated within the electronic device 1402 such that the microphone package 1404 is disposed within a housing of the electronic device 1402.

The electronic device 1402 includes one or more processors 1406 (e.g., any of microprocessors, microcontrollers, other controllers) that can process various computer-executable instructions to control the operation of the electronic device 1402.

The electronic device 1402 also includes a computer-readable media 1408 (CRM 1408) that provides storage for various applications 1410 and system data. The device applications 1410 and/or an operating system 1412 implemented as computer-readable instructions on the computer-readable media 1408 (e.g., the storage media) can be executed by the processor(s) 1406 to provide some or all of the functionalities described herein. The computer-readable media 1408 provides data storage mechanisms to store various device applications 1410, the operating system 1412, memory/storage, and other types of information and/or data related to operational aspects of the electronic device 1402. For example, the operating system 1412 can be maintained as a computer application within the computer-readable media 1408 and executed by the processor(s) 1406 to provide some or all of the functionalities described herein. The device applications 1410 may include a device manager, such as any form of a control application, a software application, or signal-processing and control modules.

Various implementations of the application(s) 1410 can include, or communicate with, a System-on-Chip (SoC), one or more Integrated Circuits (ICs), a processor having embedded processor instructions or being configured to access processor instructions stored in memory, hardware with embedded firmware, a PCB with various hardware components, or any combination thereof. The PCB may be formed, for example, from glass-reinforced epoxy material such as FR4 (flame retardant #4). In some instances, the PCB may include a single layer of electrically conductive traces and be a single-layer board. In other instances, the PCB may be a multi-layer board that includes multiple layers of electrically conductive traces that are separated by layers of a dielectric material.

The electronic device 1402 may also include a network interface 1414. The electronic device 1402 can use the network interface 1414 for communicating data over wired, wireless, optical, or audio (e.g., acoustic) networks. By way of example and not limitation, the network interface 1414 may communicate data over a local area network (LAN), a wireless local area network (WLAN), a home area network (HAN), a personal area network (PAN), a wide area network (WAN), an intranet, the Internet, a peer-to-peer network, a point-to-point network, or a mesh network. The network interface 1414 can be implemented as one or more of a serial and/or parallel interface, a wireless interface, any type of network interface, a modem, or any other type of communication interface. Using the network interface 1414, the electronic device 1402 may communicate via a cloud computing service to access a platform having resources.

The electronic device 1402 may also include a speaker 1416. The speaker 1416 can include any suitable speaker for outputting audio signals. The audio signals may be from notifications, alerts, music, speech, or other audio messages for a user. The speaker 1416 may be integrated within the electronic device 1402 such that the speaker 1416 is positioned within a housing of the electronic device 1402.

The electronic device 1402 may also include a display 1418 (e.g., display device 1418). The display 1418 can include any suitable touch-sensitive display device, such as a touchscreen, a liquid crystal display (LCD), a thin-film transistor (TFT) LCD, an in-place switching (IPS) LCD, a capacitive touchscreen display, an organic light-emitting diode (OLED) display, an active-matrix organic light-emitting diode (AMOLED) display, a super AMOLED display, and so forth. The display 1418 may be referred to as a display or a screen, such that digital content may be displayed on-screen.

The electronic device 1402 also includes an enclosure 1420 (e.g., a housing). The enclosure 1420 houses the various components of the electronic device 1402, including, for example, the microphone package 1404 and the speaker 1416. In aspects, the enclosure 1420 can include meshes (e.g., a waterproof mesh 610, a cosmetic mesh 604) to prevent dust and water from leaking into the circuitry and other components housed within the enclosure 1420.

Many components described herein are arranged within the enclosure 1420, one or more printed circuit boards, the microphone package 1404, and so forth. The enclosure 1420 includes a space or receptacle (e.g., spacer bracket 310) for holding the microphone package 1404, which is electrically coupled to the main logic board (MLB) or main PCB (e.g., main circuit board 408) of the electronic device 1402. The main PCB is also arranged within the enclosure 1420. Accordingly, the microphone package 1404 and connecting circuitry may be internal to the electronic device 1402. In implementations, the microphone 1404 has a microphone port (e.g., microphone port 402) facing outward (externally) from the electronic device 1402.

Conclusion

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Although aspects of an integrated microphone configuration directed at electronic and mechanical noise reduction have been described in language specific to techniques and/or systems, it is to be understood that the subject of the appended claims is not necessarily limited to the specific techniques or methods described. Rather, the specific techniques and methods are disclosed as example implementations of the techniques for an integrated microphone configuration directed at electronic and mechanical noise reduction. Further, various different aspects are described, and it is to be appreciated that each described aspect can be implemented independently or in connection with one or more other described aspects.

What is claimed is:

1. An electronic device comprising:
a housing having an exterior surface and an opposing interior surface, the housing enclosing a plurality of electronic components, the plurality of electronic components comprising a microphone having a top side and a bottom side;
a microphone port defining a cavity in the housing and extending from the exterior surface to the opposing interior surface, the microphone port configured to enable acoustic waves to propagate from an environment surrounding the housing through a portion of the cavity to the microphone for detection; and
a waterproof mesh stack positioned within the microphone port between the microphone and the exterior surface of the housing, the waterproof mesh stack comprising:
a sealing layer positioned as a topmost layer nearest the exterior surface and configured to absorb mechanical vibrations; and
a waterproof mesh positioned underneath the sealing layer and further from the exterior surface than the sealing layer, the waterproof mesh disposed within the microphone port sufficient to define a first region and a second region, the first region extending from a plane defined by the exterior surface to the waterproof mesh and the second region extending from the waterproof mesh to the microphone.

2. The electronic device of claim 1, further comprising a cosmetic mesh positioned at least partially within the first region and configured to prevent ingress contaminants into portions of the first region and the second region.

3. The electronic device of claim 2, wherein the waterproof mesh and the cosmetic mesh are substantially parallel.

4. The electronic device of claim 1, wherein the sealing layer has an impact resistance greater than or equal to 1 KJ/m$^2$.

5. The electronic device of claim 1, wherein the waterproof mesh comprises an ingress protection (IP) rating of IP67 or greater.

6. The electronic device of claim 1:
wherein the waterproof mesh is a first waterproof mesh having a first acoustic transfer impedance; and
further comprising a second waterproof mesh having a second acoustic transfer impedance, the second acoustic transfer impedance being less than the first acoustic transfer impedance.

7. The electronic device of claim 6, wherein the cosmetic mesh is positioned above the second waterproof mesh and nearest the exterior surface, the second waterproof mesh positioned above the first waterproof mesh proximally closer to the exterior surface than the first waterproof mesh.

8. The electronic device of claim 1, wherein the microphone port defines the cavity in the housing to form at least one of a right-angle cavity, an arced cavity, a straight cavity, an "S" shaped cavity, or a "V" shaped cavity relative to the plane of the exterior surface.

9. The electronic device of claim 1, further comprising a flexible circuit board and a main circuit board, the main circuit board parallel to the plane defined by the exterior surface and positioned above the flexible circuit board proximally closer to the exterior surface and at least partially within the second region.

10. The electronic device of claim 9, wherein the main circuit board is adhered to the flexible circuit board via an adhesive, the adhesive comprising an electrical conductivity.

11. The electronic device of claim 9, wherein the waterproof mesh is adhered to the main circuit board via a pressure-sensitive adhesive.

12. The electronic device of claim 9, wherein the top side of the microphone is mounted on the flexible circuit board in a floating configuration such that the microphone is electrically coupled to the main circuit board via the flexible circuit board.

13. The electronic device of claim 12, wherein the floating configuration creates a gap between the bottom side of the microphone and a spacer bracket that surrounds the microphone.

14. The electronic device of claim 9, wherein the microphone is mounted onto the flexible circuit board via at least one of a pressure-sensitive adhesive, mechanical fasteners, or solder.

15. The electronic device of claim 9, wherein the flexible circuit board is folded into a "U" shape.

16. The electronic device of claim 1, wherein the sealing layer comprises an adhesive foam tape.

17. The electronic device of claim 1, wherein the waterproof mesh stack further comprises a stiffening layer and one or more adhesive layers.

18. The electronic device of claim 17, wherein the stiffening layer is a thermoplastic polymer layer, the thermoplastic polymer layer configured to stabilize the waterproof mesh stack.

19. The electronic device of claim 1, wherein microphone port is positioned on a rear side of the electronic device and the cavity in the housing extends through a camera lens glass and a bezel.

20. The electronic device of claim 19, further comprising a camera module positioned proximate to the microphone.

\* \* \* \* \*